United States Patent
Frank et al.

(10) Patent No.: US 10,717,336 B2
(45) Date of Patent: Jul. 21, 2020

(54) COMPRESSED-AIR SUPPLY SYSTEM, PNEUMATIC SYSTEM AND METHOD FOR OPERATING A COMPRESSED-AIR SUPPLY SYSTEM

(71) Applicant: WABCO GmbH, Hannover (DE)

(72) Inventors: Dieter Frank, Hannover (DE); Frank Meissner, Hannover (DE); Uwe Stabenow, Laatzen (DE)

(73) Assignee: WABCO GMBH, Hannover (DE)

( * ) Notice: Subject to any disclaimer, the term of this patent is extended or adjusted under 35 U.S.C. 154(b) by 589 days.

(21) Appl. No.: 15/321,755

(22) PCT Filed: Jun. 16, 2015

(86) PCT No.: PCT/EP2015/001219
§ 371 (c)(1),
(2) Date: Dec. 23, 2016

(87) PCT Pub. No.: WO2015/197170
PCT Pub. Date: Dec. 30, 2015

(65) Prior Publication Data
US 2017/0129300 A1    May 11, 2017

(30) Foreign Application Priority Data
Jun. 25, 2014  (DE) .................. 10 2014 009 418
Jul. 24, 2014  (DE) .................. 10 2014 010 956

(51) Int. Cl.
*B60G 17/052*  (2006.01)
*F15B 21/048*  (2019.01)
(Continued)

(52) U.S. Cl.
CPC ......... *B60G 17/0523* (2013.01); *B01D 53/26* (2013.01); *B60T 17/004* (2013.01);
(Continued)

(58) Field of Classification Search
CPC ............. B60G 17/053; B60G 2500/02; B60G 2500/203; B60G 2500/2042;
(Continued)

(56) References Cited

U.S. PATENT DOCUMENTS 3,426,508 A * 2/1969 McGrath ................ B01D 46/00
                                                      137/204
3,680,283 A * 8/1972 Jones, Jr. ............. B01D 53/261
                                                       96/138
(Continued)

FOREIGN PATENT DOCUMENTS

DE         8109217 U1    5/1985
DE         3523403 A1    1/1987
(Continued)

*Primary Examiner* — Craig J Price
(74) *Attorney, Agent, or Firm* — Leydig, Voit & Mayer, Ltd.

(57) ABSTRACT

A compressed-air supply system for operating a pneumatic installation includes a reservoir, a number of bellows, a pressure-air feed to which a charging assembly having a compressor is connected on a pressure-medium feed side, a pressure-air connection to the pneumatic installation, a venting connection to the environment, a pneumatic main line between the pressure-air feed and the pressure-air connection, a vent line between the pressure-air feed and the venting connection and a changeover valve associated with the pressure-air feed and configured to be controlled by pressure air in such a way that the pressure-air feed is open or can be opened via the changeover valve to the main line. A flow pressure at the pressure-air feed can be generated by the charging assembly to the main line.

11 Claims, 8 Drawing Sheets

(51) Int. Cl.
*B60T 17/00* (2006.01)
*F15B 21/00* (2006.01)
*B01D 53/26* (2006.01)

(52) U.S. Cl.
CPC .......... *F15B 21/005* (2013.01); *F15B 21/048* (2013.01); *B60G 2500/02* (2013.01); *B60G 2500/203* (2013.01); *B60G 2500/205* (2013.01); *B60G 2500/2042* (2013.01); *B60G 2500/2044* (2013.01); *F15B 2211/50536* (2013.01); *F15B 2211/8855* (2013.01)

(58) Field of Classification Search
CPC ...... B60G 2500/2044; B60G 2500/205; B60G 2500/2012; B01D 53/26; B01D 53/261; B01D 53/263; B01D 53/265; B01D 53/268; F15B 21/005; F15B 21/0478; F15B 2211/50536; F15B 2211/8855; Y10T 137/794; Y10T 137/7782; Y10T 137/7876; Y10T 137/87193; Y10T 137/2589; F04D 25/0613–0646; F04B 35/04; F04B 35/01; F04B 27/04; F04B 17/03; F04B 49/20; F04B 2203/0209; F04B 2203/0204; B60T 17/02; B60T 17/04; B60T 17/004; G05D 16/106
USPC ..... 137/596.14, 544–550; 55/417, 419, 420; 96/116, 144; 280/124.157, 124.158, 280/124.159, 124.16, 124.161, 6.157; 210/418, 97, 302, 313
See application file for complete search history.

(56) References Cited

U.S. PATENT DOCUMENTS

| | | | | |
|---|---|---|---|---|
| 4,504,081 A | * | 3/1985 | Shimizu | B60G 17/0408 137/469 |
| 4,664,141 A | * | 5/1987 | Starr | B60G 17/0408 137/493.2 |
| 4,755,196 A | | 7/1988 | Frania et al. | |
| 5,595,588 A | * | 1/1997 | Blevins | B01D 53/0415 96/108 |
| 5,711,150 A | * | 1/1998 | Oshita | B60G 17/0523 60/407 |
| 6,098,967 A | | 8/2000 | Folchert | |
| 6,189,903 B1 | * | 2/2001 | Bloxham | B60G 17/0523 280/124.16 |
| 6,332,623 B1 | * | 12/2001 | Behmenburg | B60G 17/0155 280/124.16 |
| 6,354,617 B1 | * | 3/2002 | Behmenburg | B60G 17/0523 137/100 |
| 6,698,778 B2 | * | 3/2004 | Roemer | B60G 11/27 280/124.157 |
| 7,032,895 B2 | * | 4/2006 | Folchert | B60G 17/0523 267/64.28 |
| 7,097,166 B2 | * | 8/2006 | Folchert | B60G 17/0523 267/64.28 |
| 7,441,789 B2 | * | 10/2008 | Geiger | B60G 17/0155 280/124.157 |
| 7,484,747 B2 | * | 2/2009 | Geiger | B60G 17/0155 280/124.157 |
| 8,434,774 B2 | * | 5/2013 | Leclerc | B60G 11/58 123/184.21 |
| 8,448,951 B2 | * | 5/2013 | Hein | B60G 17/0523 280/124.16 |
| 8,490,991 B2 | * | 7/2013 | Folchert | B01D 53/261 280/124.16 |
| 8,814,190 B2 | * | 8/2014 | Becher | F04B 7/02 280/124.16 |
| 8,899,598 B2 | * | 12/2014 | Frank | F16K 31/0651 137/565.18 |
| 9,694,801 B2 | * | 7/2017 | Frank | B60G 17/0523 |
| 9,783,019 B2 | * | 10/2017 | Diekmeyer | B60G 17/0523 |
| 9,829,248 B2 | * | 11/2017 | Folchert | B60G 17/0155 |
| 9,926,994 B2 | * | 3/2018 | Frank | B60G 17/0155 |
| 10,207,558 B2 | * | 2/2019 | Ohashi | B60G 17/0155 |
| 10,288,092 B2 | * | 5/2019 | Frank | B60G 17/0523 |
| 2013/0255609 A1 | | 10/2013 | Frank et al. | |
| 2013/0276899 A1 | | 10/2013 | Frank et al. | |
| 2017/0129300 A1 | | 5/2017 | Frank et al. | |

FOREIGN PATENT DOCUMENTS

| | | |
|---|---|---|
| DE | 19724747 C1 | 6/1998 |
| DE | 102010054699 A1 | 6/2012 |
| DE | 102011109500 A1 | 6/2012 |
| EP | 0036569 A1 | 9/1981 |
| EP | 2098429 A1 | 9/2009 |
| GB | 1522652 A | 8/1978 |
| JP | S 5256325 U | 4/1977 |
| JP | S 58155463 U | 10/1983 |
| JP | S 58169272 U | 11/1983 |
| JP | S 6384470 U | 6/1988 |
| WO | WO 2015197170 A | 12/2015 |

* cited by examiner

COMPRESSED-AIR SUPPLY SYSTEM, PNEUMATIC SYSTEM AND METHOD FOR OPERATING A COMPRESSED-AIR SUPPLY SYSTEM

CROSS REFERENCE TO RELATED APPLICATIONS

This application is a U.S. National Stage Application under 35 U.S.C. § 371 of International Application No. PCT/EP2015/001219 filed on Jun. 16, 2015, and claims benefit to German Patent Application Nos. DE 10 2014 009 418.9 filed on Jun. 25, 2014 and DE 10 2014 010 956.9 filed on Jul. 24, 2014. The International Application was published in German on Dec. 30, 2015 as WO 2015/197170 A1 under PCT Article 21(2).

FIELD

The invention relates to a compressed-air supply system for operating a pneumatic installation, to a pneumatic system having a compressed-air supply system and a pneumatic installation, and to methods for controlling and operating a compressed-air supply system.

BACKGROUND

A compressed-air supply system is generally operated with a pressure medium in the form of pressure air. In general, however, operation is not restricted to operation with a pressure medium in the form of pressure air. In principle, a compressed-air supply system can also be operated with pressure media other than pressure air. A compressed-air supply system can preferably be used in vehicles of all types to supply a pneumatic installation in a vehicle with pressure air.

A compressed-air supply system is described generally in DE 81 09 217 U1. In order to be able to vent the pneumatic main line thereof automatically, which is advantageous, for example, for unpressurized compressor startup, the compressed-air supply system described has a vent valve, which is actuated by an associated pressure switch. The pressure switch itself is connected pneumatically to a pressure-air accumulator associated with the compressed-air supply system and switches when a predetermined pressure in the pressure-air accumulator is reached. Also known from the prior art are compressed-air supply systems, the respective pneumatic main lines of which are vented by an electromagnetically activated vent valve.

Such compressed-air supply systems and similar compressed-air supply systems from the prior art have practical solutions for venting the respective pneumatic main line, for example, but they are subject to certain disadvantages. Thus, in the case of electromagnetically activated vent valves, for example, there is a high susceptibility to electrical faults or cable breaks. Moreover, there is also always a need for a corresponding driver stage and control logic in an associated control unit. Depending on the stage of development thereof, this can involve increased costs or require a high complexity in the control unit.

SUMMARY

In an embodiment, the present invention provides a compressed-air supply system for operating a pneumatic installation. The compressed-air supply system includes a reservoir, a number of bellows, a pressure-air feed to which a charging assembly having a compressor is connected on a pressure-medium feed side, a pressure-air connection to the pneumatic installation, a venting connection to the environment, a pneumatic main line between the pressure-air feed and the pressure-air connection, a vent line between the pressure-air feed and the venting connection and a changeover valve associated with the pressure-air feed and configured to be controlled by pressure air in such a way that the pressure-air feed is open or can be opened via the changeover valve to the main line. A flow pressure at the pressure-air feed can be generated by the charging assembly to the main line. In the unpressurized state of the pressure-air feed, the pressure-air connection is connected to the vent line in terms of flow, in particular an outlet connection can be opened. In the pressurized state of the pressure-air feed, the pressure-air connection is not connected to the vent line in terms of flow, in particular an outlet connection can be closed.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
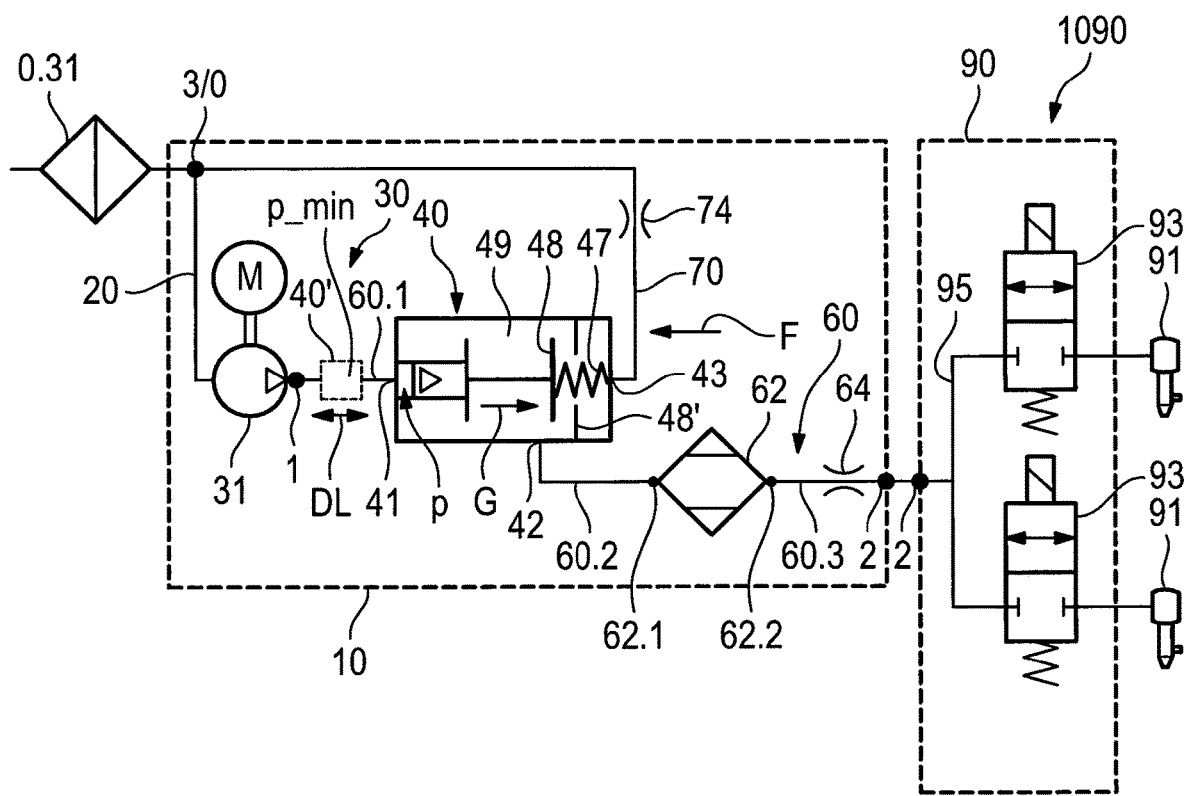
FIG. 1 shows a schematic illustration of a first embodiment of a pneumatic system having a compressed-air supply system in the venting mode and a pneumatic installation.

A compressed-air supply system, a pneumatic system, and a method for controlling a compressed-air supply system are described herein which are improved, for example simplified, with respect to the prior art. A compressed-air supply system, a pneumatic system and a method for controlling a compressed-air supply system are described herein which are relatively simple to control, preferably enabling relatively simple venting of a pneumatic main line.

A compressed-air supply system is described herein that includes a changeover valve associated with a pressure-air feed, wherein the changeover valve is designed to be controlled by pressure air in such a way that the pressure-air feed is open or can be opened via the changeover valve to the main line.

Moreover, as described herein, by means of a flow pressure at the pressure-air feed that can be generated by the charging assembly to the main line, in the unpressurized state of the pressure-air feed, the pressure-air connection is connected to the vent line in terms of flow, in particular an outlet connection can be opened, and in the pressurized state of the pressure-air feed, the pressure-air connection is not connected to the vent line in terms of flow, in particular an outlet connection can be closed.

A pneumatic installation is described herein that can preferably be connected to the pressure-air connection of the compressed-air supply system. The pneumatic system can be developed in accordance with the developments described for the compressed-air supply system.

A method is described herein for operating a compressed-air supply system in which pressure air drawn in during a charging mode is compressed by a charging assembly and fed via a changeover valve to a pneumatic main line, and in a venting mode, pressure air is discharged from the pneumatic main line via the changeover valve into a vent line, wherein in the charging mode, the changeover valve is held closed with respect to the vent line by a flow pressure of the compressed pressure air.

Open-loop and closed-loop control devices are described herein that are designed to operate a pneumatic system by way of control in accordance with the method of the invention. For this purpose, the open-loop and closed-loop control devices can be provided as software and/or hardware modules that are configured to carry out one or more method steps.

As described herein, it is a relatively simple matter to operate a compressed-air supply system and/or a pneumatic system and to make possible relatively simple venting of a pneumatic main line. In particular, it is possible, with this type of valve arrangement, for a corresponding driver stage and control logic in the associated control unit to be superfluous or at least to be simplified. Thus, disadvantages in terms of complexity and costs of a compressed-air supply system can be reduced. By virtue of the flow control of the changeover valve, which is effected by the charging assembly itself, external control of the changeover valve by means of a pneumatic control source different from the charging assembly is not required.

Valves which are closed for long periods of time tend to stick thereby causing the actual switching function thereof to fail. It has furthermore been observed that vent valves which are closed for long periods easily freeze to the valve seat, which can lead to a high safety risk on a commercial vehicle. As described herein, sticking of the valve can be virtually excluded by a pressure-air feed being open to the vent line when the changeover valve is not pressurized—i.e. when the charging assembly is not compressing—and the pressure-air feed being open to the main line independently of the pressure.

One advantage of the compressed-air supply system described herein results from connection to a pneumatic installation, e.g. an air spring installation of a vehicle. By virtue of the fact that the changeover valve closes or holds closed the pneumatic main line with respect to the vent line when in the pressurized state, it is already possible to carry out an accumulator mode in the pneumatic installation without the need for an additional shutoff valve between a gallery of the air spring installation and the compressed-air supply system. To operate with an accumulator (charge transfer), it is possible, in particular, for the compressor to start up in order to close the vent.

The changeover valve is preferably arranged on the pressure-air feed while connecting the pneumatic main line and the vent line. In particular, the changeover valve is arranged on the pressure-air feed while connecting a first part of the pneumatic main line to a pressure control connection and connecting a second part of the pneumatic main line to a pass-through connection and connecting the vent line to an outlet connection.

Provision is preferably made for a changeover valve to be associated with the pressure-air feed, wherein the changeover valve is designed to be controlled by pressure medium in such a way that the pressure-air feed is open via the changeover valve to the main line independently of the pressure, wherein, by means of a flow pressure that can be generated by the charging assembly to the main line, the pressure-air feed can be opened to the vent line in the unpressurized state and can be closed with respect to the vent line in the pressurized state. In other words, the pressure-air feed is open to the main line via the changeover valve independently of the pressure, such that the pressure-air feed can be opened to the vent line in the unpressurized state and can be closed with respect to the vent line in the pressurized state by means of a flow pressure that can be generated by the charging assembly to the main line.

It is preferably envisaged that in a venting mode, pressure air is discharged from the pneumatic main line via the changeover valve into a vent line, wherein, in the charging mode, the changeover valve is held closed with respect to the vent line by a flow pressure of the compressed pressure air.

In order to provide a particularly robust changeover valve, the changeover valve has a pressure-air distribution chamber, from which a pressure control connection connected to the charging assembly, a pass-through connection connected to the pneumatic main line, and an outlet connection connected to the vent line start, wherein, when the pass-through connection to the main line is open, a changeover valve body, which can be moved against spring force, opens the outlet connection to the vent line in the unpressurized state of the pressure control connection and closes the outlet connection to the vent line in the pressurized state.

An advantageously simple construction of the compressed-air supply system can be achieved if the changeover valve is designed to be controlled by pressure medium exclusively via the pressure control connection. It is possible to dispense completely with electromagnetic activation of the changeover valve and with an electronic controller required for this purpose. Provision is preferably made for the pressure-air feed to be open or to be capable of being opened via the changeover valve to the main line independently of the pressure, wherein the changeover valve is designed to be controlled by pressure air exclusively via the pressure control connection and/or directly via the operation of the compressor.

The changeover valve is preferably controlled by pressure medium directly through the operation of the compressor. In this way, unpressurized compressor startup is made possible in a simple manner. When the compressor is initially at rest, no pressure air flows from the pressure-air feed into the changeover valve, with the result that said valve is in the venting position and connects the pneumatic main line to the vent line. Since the pressure-air feed is open to the pneumatic main line independently of the pressure, the pressure air compressed by the compressor starting up after this can initially still escape via the venting connection. At the same time, the changeover valve is gradually switched over into the shutoff position by the rising flow pressure of the pressure air. In the shutoff position, the pneumatic main line and the vent line are pneumatically separated from one another.

As described herein, the pressure-air feed is open or can be opened via the changeover valve to the main line in a manner dependent on the pressure, wherein the changeover valve is designed to be controlled by pressure air via the pressure control connection and/or directly by the operation of the compressor, wherein a means for pressure limitation, in particular a pressure-air switch-through valve, is arranged upstream and/or downstream of the pressure control connection or is implemented by means of said connection. It is thereby advantageously possible to specify a pressure minimum and/or a pressure maximum, for example, as a permissible minimum pressure and/or maximum pressure at which the pressure control connection allows pressure application for a changeover valve body. It is optionally also possible to specify some other pressure characteristic via the means for pressure limitation for the pressure control connection.

The changeover valve can be designed to be controlled to switch over in accordance with a pressure applied to the pressure control connection and/or in accordance with a volume flow flowing from the pressure control connection into the pneumatic main line. This makes it possible to achieve different operating modes of the changeover valve. In order to prevent an impermissible excess pressure in a pneumatic installation connected to the compressed-air supply system, for example, the changeover valve can be designed to connect the pass-through connection to the outlet connection if a maximum pressure applied to the pressure control connection is exceeded. As an alternative or in addition, the changeover valve can be designed to connect the pass-through connection to the outlet connection if the flow through the pressure control connection is falls below a minimum volume flow.

A pressure-air switch-through valve can be connected upstream of the changeover valve, wherein the pressure-air switch-through valve is preferably designed to switch through only when there is a minimum pressure applied to the pressure-air switch-through valve. In this way, the switching dynamics of the changeover valve in the direction of the shutoff position thereof can be improved. Accordingly, the compressor which is starting up initially operates against a backpressure which rises to the minimum pressure. Once said minimum pressure has been reached, the pressure-air switch-through valve switches through, with the result that the pressure air flows into the changeover valve at what is now a higher initial pressure and abruptly switches the latter over. Of course, the minimum pressure of the pressure-air switch-through valve should be chosen so that smooth startup of the compressor is ensured.

In an embodiment, the changeover valve has a valve spring, which is operatively connected to the changeover valve body. The valve spring force of the valve spring is preferably designed to overcome a gas pressure force, applied to the changeover valve body on the pressure-control connection side, when the compressor is at rest.

The compressor and/or the outlet connection can be designed not to be leaktight in the static state, i.e. actually not to be leaktight, but capable of being regarded as dynamically leaktight under flow conditions, in order to allow switching over of the changeover valve to automatically vent a pneumatic installation that can be connected to the pressure-air connection.

The compressed-air supply system preferably has an air dryer. The air dryer can be incorporated into the pneumatic main line between the changeover valve and the pressure-air connection. This has proven particularly advantageous in order to provide air dryer regeneration in a manner which is particularly simple in terms of design.

It has proven advantageous that the pneumatic main line has a main restrictor, which is arranged between the pressure-air connection and the changeover valve. The main restrictor is preferably incorporated between the air dryer and the pressure-air connection. A vent restrictor is preferably provided in the vent line between the changeover valve and the venting connection. For a simple and yet robust design embodiment, it is advantageous to provide the vent restrictor in such a way that it serves simultaneously as a spring support for the valve spring, which is operatively connected to the changeover valve body.

An air dryer is preferably connected between the changeover valve and the pressure-air connection. In order to provide a particularly compact compressed-air supply system, it has proven advantageous to arrange the vent line at least partially within a volume provided by the air dryer.

In order to facilitate a movement of the changeover valve body out of the venting position into the shutoff position, the changeover valve body can be arranged so as to be movable coaxially with the vent line. If it is necessary to decouple the changeover valve function from a possible backpressure in the vent line, the changeover valve body can alternatively be arranged so as to be movable transversely to the vent line.

According to a method, a charging mode serves, in particular, to fill a pneumatic installation which can be connected to the compressed-air supply system. In the charging mode, pressure air is drawn in via the intake connection and is then compressed by the charging assembly. The compressed pressure air can flow via the changeover valve into the pneumatic main line and, from there, via a pressure-air connection into the pneumatic installation. If the pneumatic installation has one or more bellows and/or a pressure accumulator, for example, these too can be filled via the pneumatic main line of the compressed-air supply system. In the charging mode, a pneumatic connection between the pneumatic main line and the vent line can be kept shut off by the changeover valve.

A venting mode is used to vent to a pneumatic main line. In the venting mode, pressure air in the pneumatic main line is discharged via the changeover valve toward a vent line and then via a venting connection into the environment. If a pneumatic installation is connected to the pressure-air connection, for example, it is also possible for precisely this pneumatic installation to be vented in the venting mode. If the pneumatic installation has a valve block with a gallery, for example, the gallery too can be vented via the pneumatic main line of the compressed-air supply system in a venting mode of the compressed-air supply system. If the pneumatic installation has one or more bellows and/or a pressure accumulator, for example, these too can be vented via the pneumatic main line of the compressed-air supply system.

In a preferred development, the charging mode is preceded by a compressor startup mode, in which the changeover valve is closed with respect to the vent line by a rising flow pressure of the compressed pressure air.

As described herein, a changeover valve can be closed with respect to the vent line only with a speed such that a compressor generating the flow pressure starts up substantially under no pressure. This has a positive effect on the durability of the compressor or of the charging assembly. As long as the changeover valve is not completely closed with respect to the vent line, a small proportion of the pressure air compressed by the compressor can escape via the vent line.

In a particularly preferred development, the pneumatic main line is pre-vented in a compressor stop mode preceding the venting mode, with the result that the changeover valve is opened to the vent line. This can be accomplished, for example, by a pneumatic path, designed not to be leaktight in the static state, between the charging assembly and the pneumatic main line. The compressor stop mode can immediately follow a charging mode and can start at the moment in time at which the charging assembly and the compressor are at rest. The compressor stop mode can overlap in time with the charging mode, at least when a flow pressure generated by a stopping compressor is no longer sufficient to hold the changeover valve in the shutoff position.

In a particularly preferred development, a pneumatic path between the charging assembly and the pneumatic main line is open independently of the pressure in all operating modes and/or method steps. This makes control of the process significantly easier.

In order to avoid incorrect control of the changeover valve in an effective way the changeover valve is closed with respect to the vent line exclusively by a flow pressure of the compressed pressure air.

Before an accumulator mode of a pneumatic installation connected to the compressed-air supply system, a charging mode and/or a startup mode of the compressed-air supply system can take place.

Variants of a compressed-air supply system are explained below with reference to FIG. 1 through FIG. 9. The same reference signs are used below for identical or similar features or features of the same or similar function.

A pneumatic system 100 in FIG. 1 has a compressed-air supply system 10 and a pneumatic installation 90, here in the form of a schematically indicated air spring installation 1090. In the present case, the pneumatic installation 90, which is part of a vehicle air spring system (not shown fully here) having the air spring installation 1090, has two bellows valves 93, which are connected to a gallery 95.

The compressed-air supply system 10 has a pressure-air feed 1, to which a charging assembly 30 having a compressor 31 for generating pressure air DL is connected on the pressure medium feed side, the pressure air being available in a first part 60.1 of a pneumatic main line 60.

The compressed-air supply system 10 furthermore comprises a pressure-air connection 2, to which the pneumatic installation 90 is connected, and a venting connection 3 to the environment. The pneumatic main line 60 extends between the pressure-air feed 1 and the pressure-air connection 2. A vent line 70 extends between the pressure-air feed 1 and the venting connection 3. The compressor 31 is connected on the intake side to the intake connection 0, which in the present case coincides with the venting connection 3; a filter 0.31 is connected upstream of both on the intake side.

The pneumatic main line 60 has a changeover valve 40, which is connected to the pressure-air feed 1 by means of a pressure control connection 41 via the first part 60.1 of the pneumatic main line 60. Thus, the pressure control connection 41 is connected to the charging assembly 30 via the first part 60.1 of the pneumatic main line 60, with the result that a pressure p can be applied to the pressure control connection 41. The changeover valve 40 furthermore has a pass-through connection 42, which is connected to a second part 60.2 of the pneumatic main line 60. The changeover valve 40 furthermore has an outlet connection 43, which is connected to the vent line 70. The vent line 70 has a vent restrictor 74, which is arranged in the vent line 70 between the outlet connection 43 and the venting connection 3.

The changeover valve 40 has a pressure-air distribution chamber 49, in which a changeover valve body 48 with an operatively connected valve spring 47 is arranged opposite a valve seat 48'. An air dryer 62 is connected by means of connections 62.1, 62.2 in the pneumatic main line 60 between the pass-through connection 42 of the changeover valve 40 and the pressure-air connection 2. The pass-through connection 42 of the changeover valve 40 is connected to first connection 62.1 of the air dryer 62 by the second part 60.2 of the pneumatic main line 60.

A main restrictor 64 is arranged in a third part 60.3 of the pneumatic main line 60, between the second connection 62.2 of the air dryer 62 and the pressure-air connection 2.

In the present case, the changeover valve 40 is controlled by pressure medium exclusively via the pressure control connection 41. Since the changeover valve 40 is arranged immediately downstream of the compressor 31, the changeover valve 40 is controlled by pressure medium directly via the operation of the compressor 31.

The pressure-air feed 1 is open via the changeover valve 40 to the main line 60 independently of the pressure, i.e. the pressure-air feed 1 is in pneumatic connection with the pneumatic main line 60, namely the first part 60.1 of the pneumatic main line 60, independently of a particular position of the changeover valve body 48. In the unpressurized state, shown in FIG. 1, the pneumatic main line 60 is connected pneumatically to the vent line 70 via the changeover valve 40. Only in the case of a compressor start is the volume-flow-dependent changeover valve 40 in receipt of a flow and hence actuated against a spring force F, i.e. closed. The compressed-air supply system 10 in the drawing, in this case FIG. 1, thus provides a dryer circuit with a self-sealing air dryer outlet, i.e. from the first connection 62.1 of the air dryer 62 to the outlet connection 43 by means of the changeover valve 48; this is accomplished while eliminating a vent magnet according to the following circuit.

As an option, however, a pressure-air switch-through valve 40' can be arranged upstream and/or downstream of the pressure control connection 41 of the changeover valve 40 in the first part 60.1 of the pneumatic main line 60, said switch-through valve being designed in such a way that it can be switched through, i.e. opens, only at a minimum pressure p_min on the pressure-air switch-through valve 40'. Only a corresponding pressure difference due to the minimum pressure p_min with respect to a static pressure then leads to a volume flow, which then brings about the switching over of the changeover valve 40, i.e. the closing of the latter with the actuation of the changeover valve body 48 toward the valve seat 48' against the spring force F, i.e. a static pressure below the minimum pressure p_min is not itself sufficient to bring about the switching over of the changeover valve 40.

The changeover valve 40 itself is designed to be controlled by pressure air in such a way that the pass-through connection 42 remains connected to the outlet connection 43 by means of said valve; namely, the outlet connection 43 is held open in the event that pressure air DL flowing through the pressure control connection 41 falls below a minimum volume flow V_min. The changeover valve 40 has a valve spring 47, which is operatively connected to a changeover valve body 48 and the valve spring force F of which is designed to overcome a total force—made up of the gas pressure force G and friction—applied to the changeover valve body 48 on the pressure-control connection side, in the event that the compressor 31 is at rest. Thus, while the compressor 31 keeps the air dryer outlet closed by its operation since the changeover valve body 48 is pressed onto its valve seat 48', the changeover valve body 48 falls away from its valve seat 48' and back into the initial position owing to the spring force F when the compressor stops, because of the absence of the incident flow force of the gas pressure force G. As a result, the air dryer outlet, i.e. from the first connection 62.1 of the air dryer 62 to the outlet connection 43, is opened at the valve seat 48' by means of the changeover valve body 48. The air dryer 62 is fully vented, as is, in particular, the gallery 95 of the pneumatic installation 90.

The operation of the compressed-air supply system 10 shown in FIG. 1 is explained in greater detail below. The venting position of the changeover valve 40, said position being shown in FIG. 1, is adopted when the compressed-air supply system 10 is in a venting mode. In the venting mode, the compressor 31 of the charging assembly 30 is at rest and no pressure air flows from the charging assembly 30, via the pressure control connection 41, into a pressure-air distribution chamber 49 of the changeover valve 40. Accordingly, the changeover valve body 48 arranged in the pressure-air distribution chamber 49 is not subject to an incident flow on the pressure control connection side and therefore there is a pneumatic connection between the pneumatic main line 60 and the vent line 70 since the changeover valve body 48 is held raised from its seat owing to the valve spring force F of the valve spring 47, and thus the outlet connection 43 from the pressure-air distribution chamber 49 to the vent line 70 is open. Pressure air present in the pneumatic main line or flowing back from the pneumatic installation into the compressed-air supply system via the pressure-air connection 2 is discharged via the vent line 70. By means of the valve spring 47, this pneumatic connection between the pneumatic main line 60 and the vent line 70 is held open. The bellows valves 93, in the present case designed as 2/2-way valves, are in the shutoff position, with the result that no pressure air can escape from the bellows 91 arranged downstream of the bellows valves 93.

Figure 2:
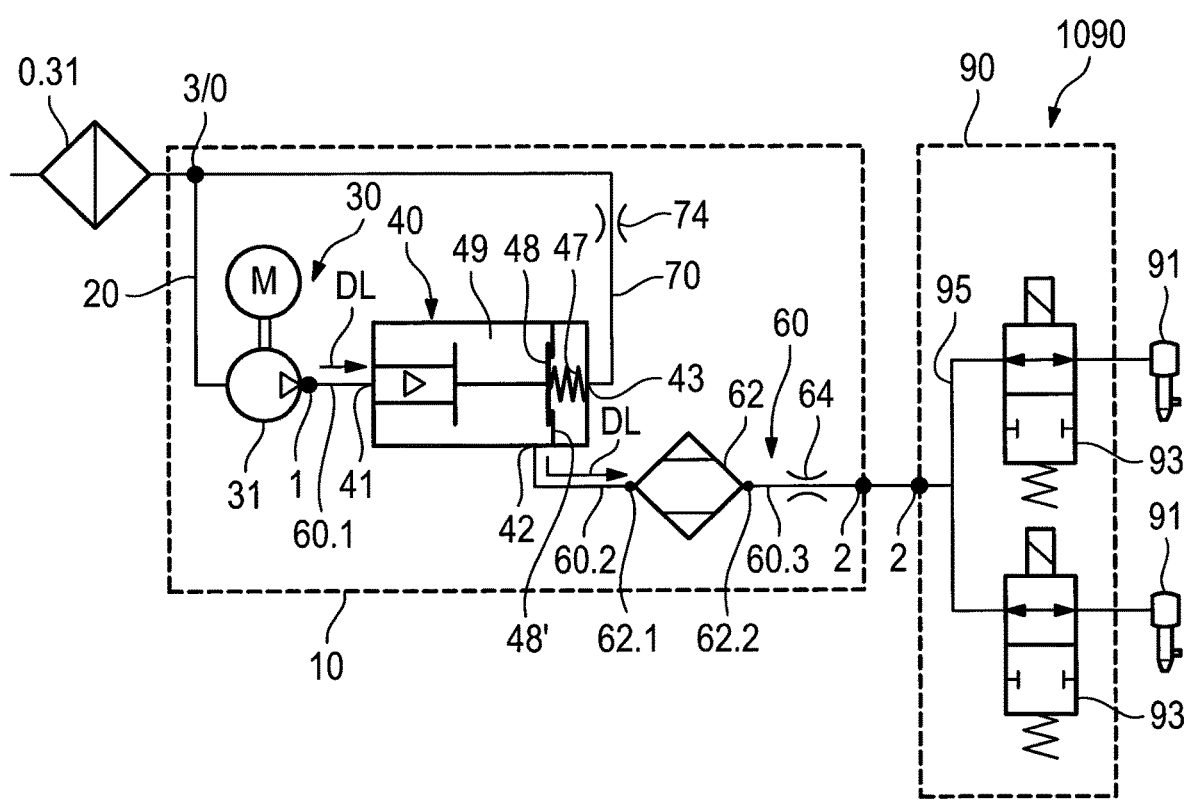
FIG. 2 shows a schematic illustration of the embodiment from FIG. 1 in the charging mode.

FIG. 2 shows the embodiment from FIG. 1 in the charging mode. In the charging mode, pressure air drawn in via the intake connection 0 is compressed by the compressor 31 and is thus available at the pressure-air feed 1; as indicated by the arrows, the pressure air DL can be fed to the changeover valve 40 via the pressure control connection 41 and the first part 60.1 of the pneumatic main line 60. The pressure air flowing under pressure p into the pressure-air distribution chamber 49 of the changeover valve 40 via the pressure control connection 41 flows against the changeover valve body 48. The flow pressure force resulting at the changeover valve body 48 is greater than the restoring force applied by the valve spring 47 and presses said valve body onto its valve seat 48'. Accordingly, the changeover valve body 48 closes the pneumatic connection between the first part 60.1 of the pneumatic main line 60 and the vent line 70 at the valve seat 48'. The continuous incident flow against the changeover valve body 48 ensures that, in the charging mode, the changeover valve 40 is held closed with respect to the vent line 70 by a flow pressure p of the compressed pressure air DL.

FIG. 2 likewise shows that the pressure-air feed 1 is open to the first part 60.1 of the pneumatic main line 60 independently of the pressure. Accordingly, the compressed pressure air DL compressed by the compressor 31 flows via the pass-through connection 42 of the changeover valve 40 into the second part 60.2 of the pneumatic main line 60, as indicated by the arrows. Subsequently, the pressure air DL passes through the air dryer 62 and the third part 60.3 of the pneumatic main line 60 containing the main restrictor 64 to the pressure-air connection 2.

The bellows valves 93 of the pneumatic installation 90 are in the open position, with the result that the pressure air DL which is fed to the pressure-air connection 2 from the compressor 31 can flow into the bellows 91. This leads to the raising of a vehicle, for example, if the pneumatic installation 90 is part of a designated air spring installation 1090, e.g. having a level regulating installation, of a vehicle 1000.

Figure 3:
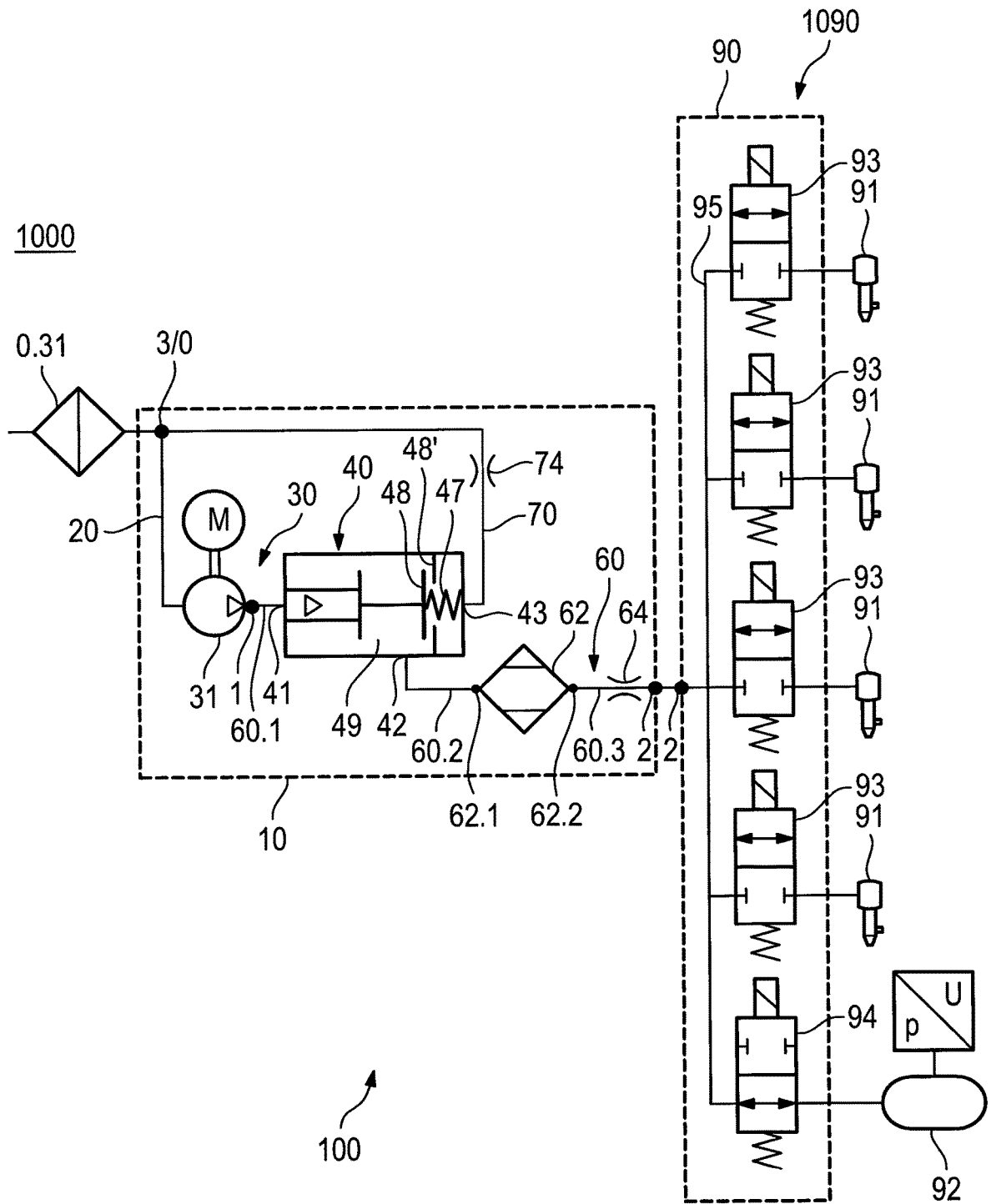
FIG. 3 shows a schematic illustration of a second embodiment of a pneumatic system having a compressed-air supply system in the compressor stop mode and a pneumatic installation.

In contrast to the embodiment in FIG. 1 and FIG. 2, the pneumatic system 100 in FIG. 3 has a pneumatic installation 90 with a 5-fold valve block consisting of four bellows valves 93 and an accumulator valve 94 connected to an accumulator 92, wherein the valves are connected to a gallery 95. As regards the compressed-air supply system 10 itself, the embodiment shown in FIG. 3 corresponds to that shown in FIG. 1.

As explained, the changeover valve 40 itself is, in the present case, designed to be controlled by pressure air in such a way that, by means of said valve, the pass-through connection 42 remains connected to the outlet connection 43 in the event that pressure air DL flowing through the pressure control connection 41 falls below a minimum volume flow V_min. As an alternative or in addition (not shown in FIGS. 1 and 2), in particular in addition, the changeover valve 40 itself can be designed to be controlled by pressure air in such a way that, by means of said valve, the pass-through connection 42 is connected to the outlet connection 43 in the event that a static pressure prevailing in the pressure control connection 41 exceeds a permitted maximum pressure p_max. An excess pressure safeguard is thereby advantageously achieved within the context of a pressure limiting valve function, protecting the air dryer 62 and the pneumatic installation 90 from excess pressure and, instead, dissipating said pressure into the vent line 70.

To achieve the pressure limiting valve function of the changeover valve 40, the valve spring 47 can be designed in such a way that, when a static pressure prevailing in the pressure control connection 41 has exceeded a permitted maximum pressure p_max in the charging mode, the pass-through connection 42 is connected to the outlet connection 43, i.e. the changeover valve body 48 rises from its valve seat 48' above the permitted maximum pressure p_max and falls back into the initial position and prevents a further pressure buildup in the air dryer 62 and/or the pneumatic installation 90. In the case of such a high pressure above the maximum pressure p_max, a volume flow of the pressure air DL flowing through the pressure control connection 41 is usually low again; i.e. pressure air DL flowing through the pressure control connection 41 furthermore generally falls below a minimum volume flow V_min, as a result of which the flow force of the pressure air DL acting on the changeover valve body decreases. Owing to the absence of the incident flow force counter to the spring force F, the changeover valve body 48 then falls back into the initial position and opens the vent line 70, i.e. connects the pass-through connection 42 to the outlet connection 43.

The compressor stop mode is explained with reference to the embodiment shown in FIG. 3. The compressor stop mode in FIG. 3 occurs immediately after the charging mode described with reference to FIG. 2. In the compressor stop mode, the pressure-air feed 1 is open to the first part 60.1 of the pneumatic main line 60, whereas the pneumatic main line 60 is shut off from the vent line 70.

Owing to the fact that the compressor mode has just ended, a system pressure higher than the ambient pressure prevails in the pneumatic path, in particular the pneumatic main line 60, between the compressor 31 and the pressure-air connection 2. The pressure force acting on the changeover valve body 48 owing to this increased system pressure is higher than the force applied by the valve spring 47. Thus, initially, the pneumatic main line 60 is still closed with respect to the vent line 70; the changeover valve 40 is still in the shutoff position, as shown in FIG. 2.

In order to bring about a return of the changeover valve body 48 into the venting position driven by the valve spring 47, as shown in FIG. 3, the system pressure prevailing in the pressure-air distribution chamber 49 must be brought back to ambient pressure. To achieve this, the compressor 31 is designed not to be leaktight in the static state. As an alternative or in addition, the outlet connection 43, or even some other component arranged in the pneumatic path between the compressor 31 and the pressure-air connection 2, can also be designed not to be leaktight in the static state. By means of said static lack of leaktightness, the system pressure prevailing immediately at the beginning of the compressor stop mode can dissipate gradually to ambient pressure, as a result of which the changeover valve 40 adopts the venting position. That is to say that the pressure force acting on the changeover valve body 48 owing to the system pressure decreases and, ultimately, is then less than the force applied by the valve spring 47; the changeover valve body 48 illustrated in FIG. 3 is thus shown in a position in which it is raised from its valve seat 48'.

Figure 4:
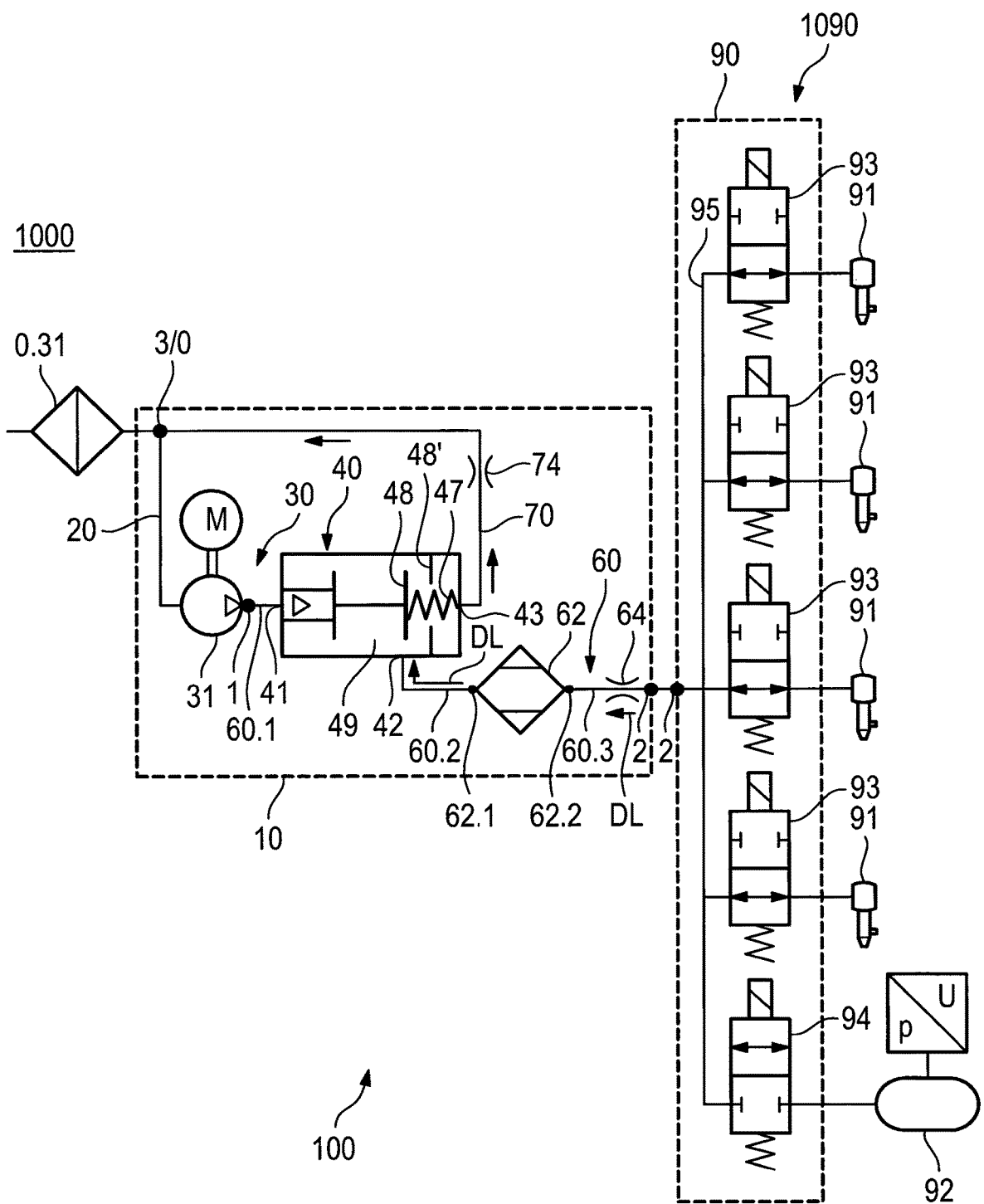
FIG. 4 shows a schematic illustration of the embodiment from FIG. 3 in the emptying mode.

FIG. 4 shows the embodiment described with reference to FIG. 3, wherein the changeover valve 40 is now in the venting position (for lowering the vehicle). Pressure air DL in the pneumatic main line 60 or pressure air DL flowing back from the pneumatic installation 90 into the compressed-air supply system 10 via the pressure-air connection 2 can now flow via the third part 60.3 of the pneumatic main line 60 and the changeover valve 40 into the vent line 70, as indicated by the arrows, and, from there, out to the venting connection 3. In this venting mode, the air dryer 62 in the third part 60.3 of the pneumatic main line 60 is simultaneously regenerated.

Figure 5:
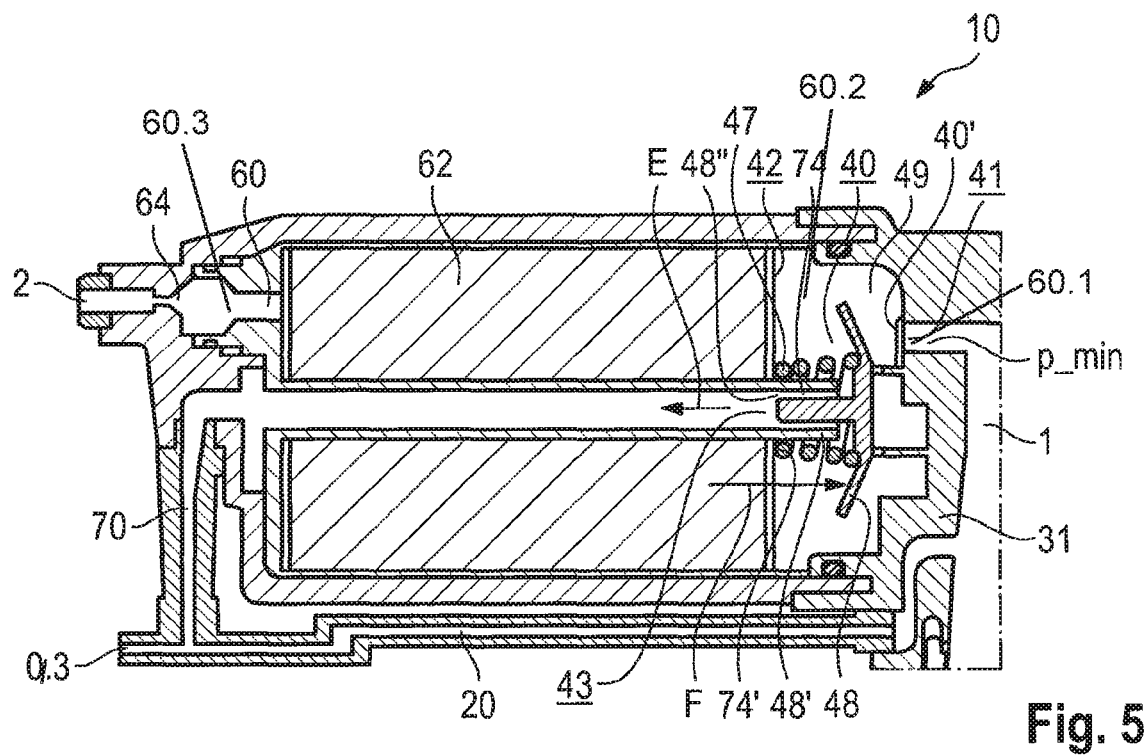
FIG. 5 shows a schematic illustration of a third embodiment of a compressed-air supply system in a design detail.

FIG. 5 shows a design embodiment of a compressed-air supply system 10. The compressed-air supply system 10 has a pressure-air feed 1, in which a compressor 31 is enclosed on the pressure-medium feed side. The compressed-air supply system 10 furthermore has a pressure-air connection 2 to a pneumatic installation 90 (not shown), a venting connection 3 to the environment and an intake connection 0, which, in the present case, coincides with the venting connection 3. The compressor 31 is connected to the intake connection by an intake line 20. A pneumatic main line 60 extends between the pressure-air feed 1 and the pressure-air connection 2. In this arrangement, the pneumatic main line 60 has an air dryer 62, and the pneumatic main line 60 extends through the air dryer 62. A vent line 70 extends between the pressure-air feed 1 and the venting connection 3, wherein the vent line 70 is arranged partially within a volume provided by the air dryer 62. The pressure-air feed furthermore has a changeover valve 40, via which the pressure-air feed 1 is open to the main line 60 independently of the pressure. The changeover valve 40 has a pressure-air distribution chamber 49, in which a changeover valve body 48, which can be moved against the spring force F of the valve spring 47, is arranged. The changeover valve furthermore has a pressure control connection 41 connected to the air compressor 31 of the charging assembly 30, a pass-through connection 42 connected to the pneumatic main line 60, and an outlet connection 43 connected to the vent line 70. The partial projection of the valve seat 48' of the changeover valve body 48 into the vent line 70 defines a vent restrictor 74. A pressure-air switch-through valve 40'—here designed as a reed valve by way of example—serving as a means for pressure limitation is arranged downstream or upstream—in this case embodied thereby—of the pressure control connection 41 of the changeover valve 40, said switch-through valve being designed in such a way that it can be switched through only at a minimum pressure p_min applied to the pressure-air switch-through valve 40'. The pressure-air feed 1 can be opened via the changeover valve 40 to the main line 60 in a manner dependent on the pressure.

In the present case, the vent restrictor 74 is therefore formed by a constriction 48". In a modified embodiment, the vent restrictor 74 can simultaneously form the spring support for the valve spring 47 in contact with the changeover valve body 48. The changeover valve body 48 is furthermore arranged so as to be coaxially movable relative to the vent line 70. The valve spring 47 is arranged in such a way relative to the vent restrictor 74 that the pressure-air venting direction E is parallel to the spring force F.

The operation of the compressed-air supply system 10 shown in FIG. 5 will be explained in greater detail below. The compressed-air supply system 10 is shown in a venting mode, i.e. no pressure air is drawn in via the intake connection 0 and compressed by means of the compressor 31. Accordingly, the pressure-air feed 1 is not under pressure and the changeover valve body 48 is not subject to a pressurized flow and raised from its valve seat 48'. Accordingly, the changeover valve 40 is in the venting position, i.e. pressure air entering via the pressure-air connection 2 can pass via the pressure-air distribution chamber 49 into the vent line 70 so as to be fed from there to the venting connection 3. It is likewise evident from FIG. 5 that the pressure-air feed 1 is open via the changeover valve 40 to the main line 60 independently of the pressure. That is to say that pressure air can flow toward the pressure-air connection 2 via the pressure-air feed 1 irrespective of the particular position of the changeover valve body 48. If the compressed-air supply system 10 is now put into a compressor startup mode, pressure air begins to be drawn in via the intake connection 0 and the pressure air drawn in begins to be fed toward the compressor 31 via the intake line 20. The pressure air which is now compressed by means of the compressor 31 passes via the pressure control connection 41 (e.g. a pressure valve) into the pressure-air distribution chamber 49 and flows against the changeover valve body 48, which is of disk-shaped design.

Owing to the flow pressure of the pressure air flowing against the changeover valve body 48, the changeover valve body 48 is pressed onto its valve seat 48' against the spring force F of the valve spring 47, thereby shutting off the pressure-air distribution chamber 49 from the vent line 70. The pressure air that now flows into the pressure-air distribution chamber 49 via the pressure-air feed 1 can now flow toward the pressure-air connection 2 only via the pneumatic main line containing the air dryer 62. If the compressor 31 comes to a halt, i.e. if no new pressure air is compressed, the changeover valve body 48 initially remains in its closed position on the valve seat 48'. By virtue of the fact that the compressor 31 is designed not to be leaktight in the static state, the excess pressure prevailing in the pressure-air distribution chamber 49 can flow back via the pressure-air feed 1 and the compressor 31 into the vent line 20. Subsequently, the expanding valve spring 47 moves the changeover valve body 48 into the venting position, i.e. said body is raised once more from its valve seat 48'.

Figure 6:
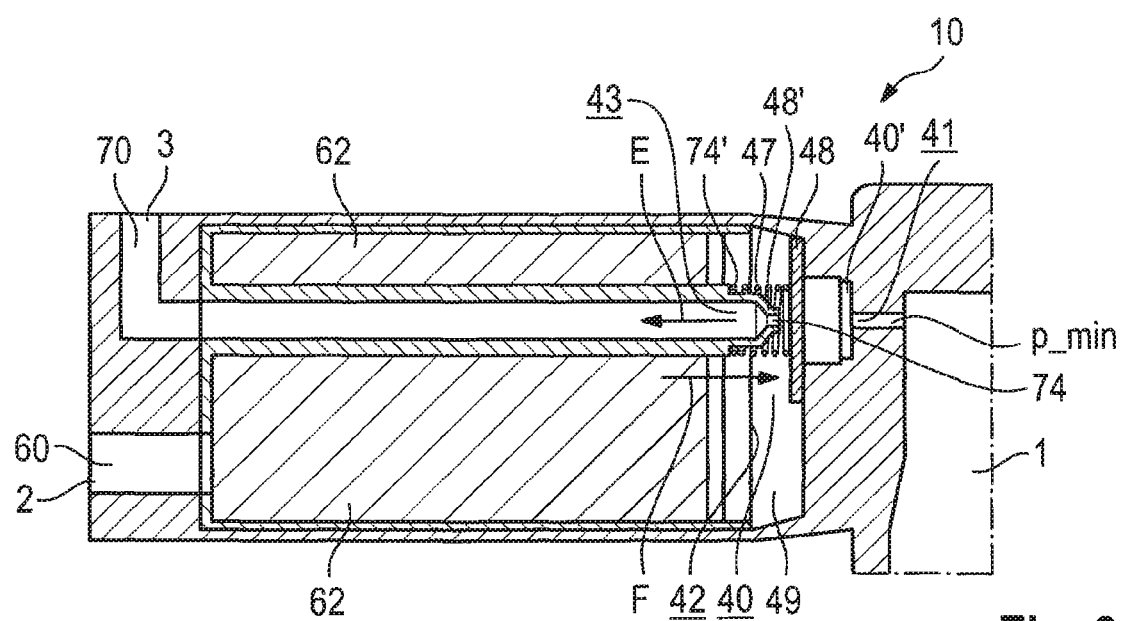
FIG. 6 shows a schematic illustration of a fourth embodiment of a compressed-air supply system in a design detail.

FIG. 6 shows an alternative design embodiment of a compressed-air supply system 10. The compressed-air supply system 10 has a pressure-air feed 1. The compressed-air supply system 10 furthermore has a pressure-air connection 2 to a pneumatic installation 90 (not shown) and a venting connection 3 to the environment. A pneumatic main line 60 extends between the pressure-air feed 1 and the pressure-air connection 2. In this arrangement, the pneumatic main line 60 has an air dryer 62, and the pneumatic main line 60 extends through the air dryer 62. A vent line 70 extends between the pressure-air feed 1 and the venting connection 3, wherein the vent line 70 is arranged partially within a volume provided by the air dryer 62. The compressed-air supply system 10 has a vent restrictor 74, which is arranged in the vent line 70. The compressed-air supply system 10 furthermore has a changeover valve 40 having a pressure control connection 41 connected to the pressure-air feed, a pass-through connection 42 connected to the pneumatic main line 60, and an outlet connection 43 connected to the vent line 70. A pressure-air switch-through valve 40' designed as a reed valve and serving as a means for pressure limitation is arranged downstream of the pressure control connection 41 of the changeover valve 40, said switch-through valve being designed in such a way that it can be switched through only at a minimum pressure p_min applied to the pressure-air switch-through valve 40'. The pressure-air feed 1 can thus be opened to the main line 60 via the changeover valve 40 in a manner dependent on the pressure.

The changeover valve 40 has a pressure-air distribution chamber 49, in which a changeover valve body 48 that can be moved against the spring force F of the valve spring 47 and, in the present case, is of disk-shaped design is arranged. The changeover valve body 48 is arranged so as to be coaxially movable relative to the pressure-air venting direction E of the vent restrictor 74. The valve spring 47 is arranged in such a way relative to the vent restrictor 74 that the pressure-air venting direction E is parallel to the spring force F. The vent restrictor 74 simultaneously forms a valve seat 48' of the changeover valve body 48 and the spring support 74' for the valve spring 47 in contact with the changeover valve body 48. In the unpressurized state, shown here, of the pressure-air feed 1, the pressure-air connection 2 is connected to the vent line 70 in terms of flow. In this state, the changeover valve 40 is held open by the spring force F of the valve spring 47; i.e. the changeover valve body 48 is raised from its valve seat 48'. By supplying the pressure-air feed 1 with pressure air (not shown), the changeover valve body 48 is moved against the spring force F of the valve spring 47 and pressed onto its valve seat 48'; the changeover valve 40 is thus closed in such a way that the pressure-air connection 2 is no longer connected to the vent line 70 in terms of flow.

Figure 7:
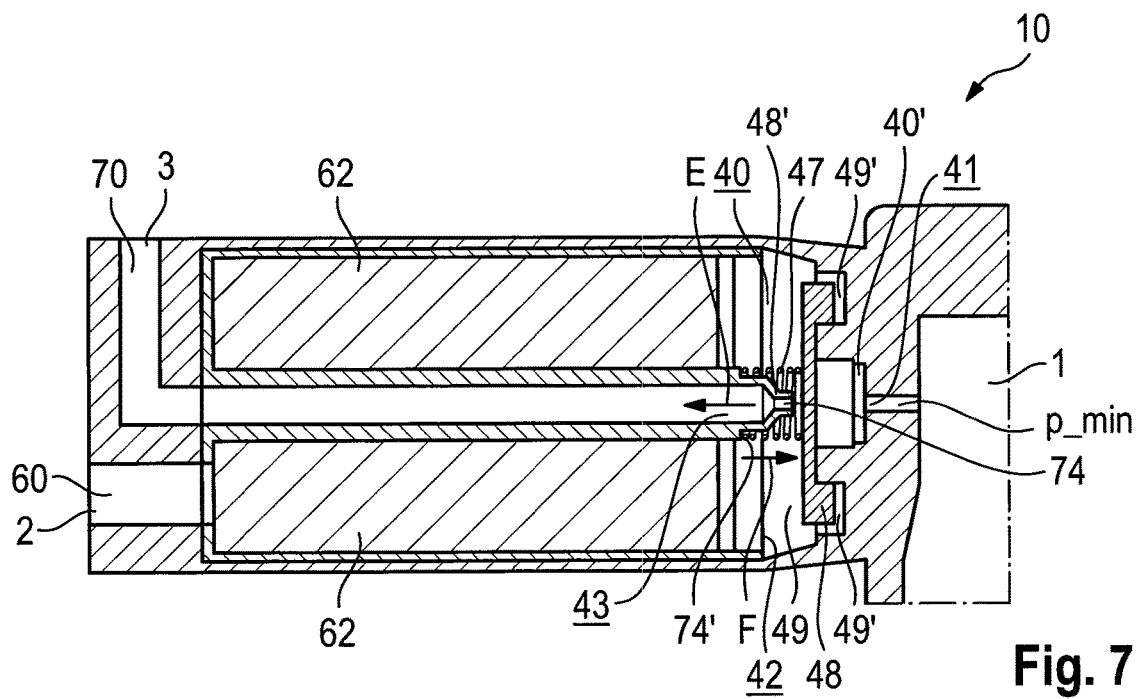
FIG. 7 shows a schematic illustration of a fifth embodiment of a compressed-air supply system in a design detail.

FIG. 7 shows another alternative design embodiment of a compressed-air supply system 10. The compressed-air supply system 10 has a pressure-air feed 1. The compressed-air supply system 10 furthermore has a pressure-air connection 2 to a pneumatic installation 90 (not shown) and a venting connection 3 to the environment. A pneumatic main line 60 extends between the pressure-air feed 1 and the pressure-air connection 2. In this arrangement, the pneumatic main line 60 has an air dryer 62, and the pneumatic main line 60 extends through the air dryer 62. A vent line 70 extends between the pressure-air feed 1 and the venting connection 3, wherein the vent line 70 is arranged partially within a volume provided by the air dryer 62. The compressed-air supply system 10 has a vent restrictor 74, which is arranged in the vent line 70. The compressed-air supply system 10 furthermore has a changeover valve 40 having a pressure control connection 41 connected to the pressure-air feed, a pass-through connection 42 connected to the pneumatic main line 60, and an outlet connection 43 connected to the vent line 70. A pressure-air switch-through valve 40' designed as a reed valve and serving as a means for pressure limitation is arranged downstream of the pressure control connection 41 of the changeover valve 40, said switch-through valve being designed in such a way that it can be switched through only at a minimum pressure p_min applied to the pressure-air switch-through valve 40'. The pressure-air feed 1 can thus be opened via the changeover valve 40 to the main line 60 in a manner dependent on the pressure.

The changeover valve 40 has a pressure-air distribution chamber 49, in which a changeover valve body 48 that can be moved against the spring force F of the valve spring 47 and, in the present case, is of dish-shaped design is arranged. The changeover valve body 48 is arranged so as to be coaxially movable relative to the pressure-air venting direction E of the vent restrictor 74. The valve spring 47 is arranged in such a way relative to the vent restrictor 74 that the pressure-air venting direction E is parallel to the spring force F. The vent restrictor 74 simultaneously forms a valve seat 48' of the changeover valve body 48 and the spring support 74' for the valve spring 47 in contact with the changeover valve body 48. In the unpressurized state, shown here in FIG. 7, of the pressure-air feed 1, the pressure-air connection 2 is connected to the vent line 70 in terms of flow. In this state, the changeover valve 40 is held open by the spring force F of the valve spring 47; i.e. the changeover valve body 48 is raised from its valve seat 48'.

By supplying the pressure-air feed 1 with pressure air (not shown), i.e. with the initiation of the charging mode, the changeover valve body 48 is moved against the spring force F of the valve spring 47 in the direction of its valve seat 48' in order to close the changeover valve 40 in such a way that the pressure-air connection 2 is no longer connected to the vent line 70 in terms of flow. In order to facilitate lifting of the changeover valve body 48 out of the position shown in FIG. 7, counter to the spring force F of the valve spring 47, at the beginning of this movement, the changeover valve 40 has an auxiliary pressure-air distribution chamber 49'. When the pressure-air feed 1 is supplied with pressure air, some of the pressure air DL enters the auxiliary pressure-air distribution chamber 49' and results in a force component which is counter to the spring force F of the valve spring 47. In the course of the charging mode, the changeover valve body 48 is pressed onto its valve seat 48'; the changeover valve 40 is thus closed in such a way that the pressure-air connection 2 is no longer connected to the vent line 70 in terms of flow.

Figure 8:
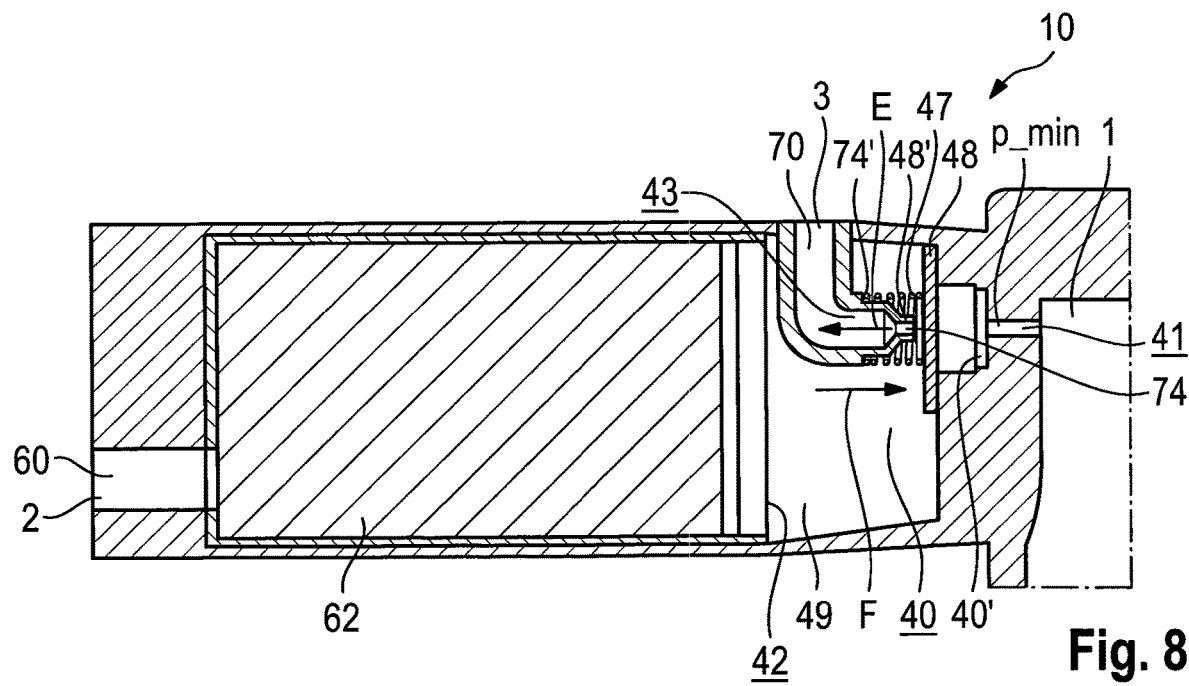
FIG. 8 shows a schematic illustration of a sixth embodiment of a compressed-air supply system in a design detail.

FIG. 8 shows another alternative design embodiment of a compressed-air supply system 10. The compressed-air supply system 10 has a pressure-air feed 1. The compressed-air supply system 10 furthermore has a pressure-air connection 2 to a pneumatic installation 90 (not shown) and a venting connection 3 to the environment. A pneumatic main line 60 extends between the pressure-air feed 1 and the pressure-air connection 2. In this arrangement, the pneumatic main line 60 has an air dryer 62, and the pneumatic main line 60 extends through the air dryer 62. A vent line 70 extends between the pressure-air feed 1 and the venting connection 3. The vent line 70 is arranged outside a volume provided by the air dryer 62. The compressed-air supply system 10 has a vent restrictor 74, which is arranged in the vent line 70. The compressed-air supply system 10 furthermore has a changeover valve 40 having a pressure control connection 41 connected to the pressure-air feed, a pass-through connection 42 connected to the pneumatic main line 60, and an outlet connection 43 connected to the vent line 70. A pressure-air switch-through valve 40' designed as a reed valve and serving as a means for pressure limitation is arranged downstream of the pressure control connection 41 of the changeover valve 40, said switch-through valve being designed in such a way that it can be switched through only at a minimum pressure p_min applied to the pressure-air switch-through valve 40'. The pressure-air feed 1 can thus be opened via the changeover valve 40 to the main line 60 in a manner dependent on the pressure.

The changeover valve 40 has a pressure-air distribution chamber 49, in which a changeover valve body 48 that can be moved against the spring force F of the valve spring 47 and, in the present case, is of disk-shaped design is arranged. The changeover valve body 48 is arranged so as to be coaxially movable relative to the pressure-air venting direction E of the vent restrictor 74. The valve spring 47 is arranged in such a way relative to the vent restrictor 74 that the pressure-air venting direction E is parallel to the spring force F. The vent restrictor 74 simultaneously forms a valve seat 48' of the changeover valve body 48 and the spring support 74' for the valve spring 47 in contact with the changeover valve body 48. In the unpressurized state, shown here, of the pressure-air feed 1, the pressure-air connection 2 is connected to the vent line 70 in terms of flow. In this state, the changeover valve 40 is held open by the spring force F of the valve spring 47. By supplying the pressure-air feed 1 with pressure air (not shown), the changeover valve body 48 is moved against the spring force F of the valve spring 47 and pressed onto its valve seat 48'; the changeover valve 40 is thus closed in such a way that the pressure-air connection 2 is no longer connected to the vent line 70 in terms of flow.

Figure 9:
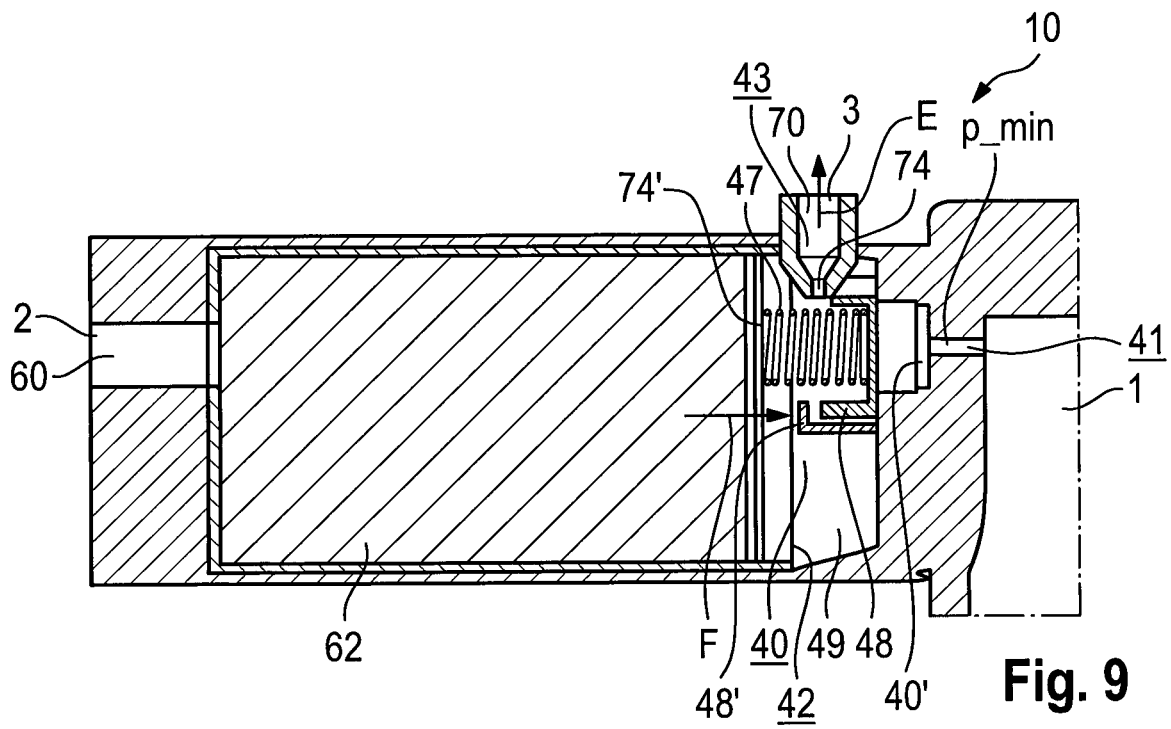
FIG. 9 shows a schematic illustration of a seventh embodiment of a compressed-air supply system in a design detail.

FIG. 9 shows another alternative design embodiment of a compressed-air supply system 10. The compressed-air supply system 10 has a pressure-air feed 1. The compressed-air supply system 10 furthermore has a pressure-air connection 2 to a pneumatic installation 90 (not shown) and a venting connection 3 to the environment. A pneumatic main line 60 extends between the pressure-air feed 1 and the pressure-air connection 2. In this arrangement, the pneumatic main line 60 has an air dryer 62, and the pneumatic main line 60 extends through the air dryer 62. A vent line 70 extends between the pressure-air feed 1 and the venting connection 3. The vent line 70 is arranged outside a volume provided by the air dryer 62. The compressed-air supply system 10 has a vent restrictor 74, which is arranged in the vent line 70. The compressed-air supply system 10 furthermore has a changeover valve 40 having a pressure control connection 41 connected to the pressure-air feed, a pass-through connection 42 connected to the pneumatic main line 60, and an outlet connection 43 connected to the vent line 70. A pressure-air switch-through valve 40' designed as a reed valve and serving as a means for pressure limitation is arranged downstream of the pressure control connection 41 of the changeover valve 40, said switch-through valve being designed in such a way that it can be switched through only at a minimum pressure p_min applied to the pressure-air switch-through valve 40'. The pressure-air feed 1 can thus be opened via the changeover valve 40 to the main line 60 in a manner dependent on the pressure.

The changeover valve 40 has a pressure-air distribution chamber 49, in which a changeover valve body 48 that can be moved against the spring force F of the valve spring 47 and, in the present case, is of sleeve-shaped design is arranged. The changeover valve body 48 is arranged so as to be transversely movable relative to the pressure-air venting direction E of the vent restrictor 74. The valve spring 47 is arranged in such a way relative to the vent restrictor 74 that the pressure-air venting direction E is transverse to the spring force F. In the present case, a valve seat 48' of the changeover valve body 48 is designed as a collar, which is formed on the changeover valve 40. The air dryer 62 forms the spring support 74' for the valve spring 47 in contact with the changeover valve body 48. In the unpressurized state, shown here, of the pressure-air feed 1, the pressure-air connection 2 is connected to the vent line 70 in terms of flow. In this state, the changeover valve 40 is held open by the spring force F of the valve spring 47. By supplying the pressure-air feed 1 with pressure air (not shown), the changeover valve body 48 is moved against the spring force F of the valve spring 47 and pressed onto its valve seat 48'; the changeover valve 40 is thus closed in such a way that the pressure-air connection 2 is no longer connected to the vent line 70 in terms of flow.

Figure 10:
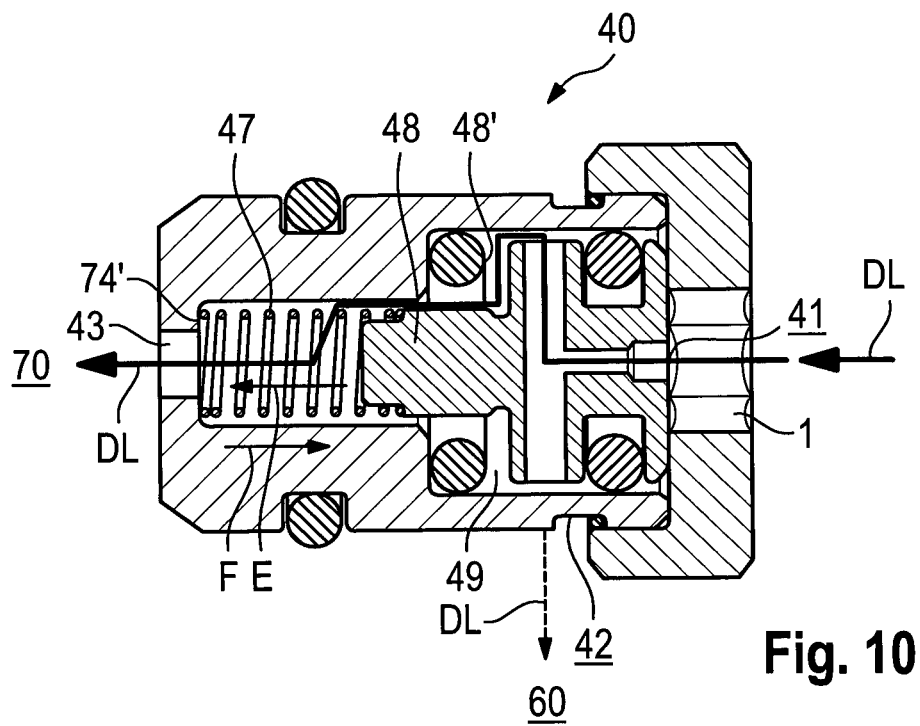
FIG. 10 shows an embodiment of a changeover valve, which is designed to be controlled by pressure medium in such a way that a pressure-air feed via the changeover valve to the main line and the vent line can be adjusted.

FIG. 10 shows an illustrative design implementation of a changeover valve 40, having a pressure control connection 41 connected to a pressure-air feed 1, a pass-through connection 42 connected to the pneumatic main line 60, and an outlet connection 43 connected to the vent line 70, said valve being designed to be controlled by pressure air in such a way that routing of pressure air DL from the pressure-air feed 1, via the changeover valve 40, to the vent line 70 can be set. The pressure-air feed 1 is open via the changeover valve 40 to the main line 60 independently of the pressure. The changeover valve 40 has a pressure-air distribution chamber 49, in which a changeover valve body 48 that can be moved against the spring force F of the valve spring 47 and, in the present case, is of plunger-shaped design is arranged. The valve spring 47 is arranged in such a way within the changeover valve 40 that the pressure-air venting direction E is parallel to the spring force F. A spring support 74' of the valve spring 47 in contact with the changeover valve body 48 is formed by the changeover valve 40 itself and, in the present case, a valve seat 48' of the changeover valve body 48 is formed by a sealing ring of the changeover valve 40.

In the unpressurized state, shown here in FIG. 10, of the pressure-air feed 1, the pass-through connection 42 is connected to the vent line 70 in terms of flow. In this state, the changeover valve 40 is held open by the spring force F of the valve spring 47, i.e. the changeover valve body 48 is raised from its valve seat 48'. By supplying the pressure-air feed 1 with pressure air (not shown), the changeover valve body 48 is moved against the spring force F of the valve spring 47 and pressed onto the sealing ring forming the valve seat 48'; the changeover valve 40 is thus closed in such a way that the pass-through connection 42 is no longer connected to the vent line 70 in terms of flow.

Figure 11:
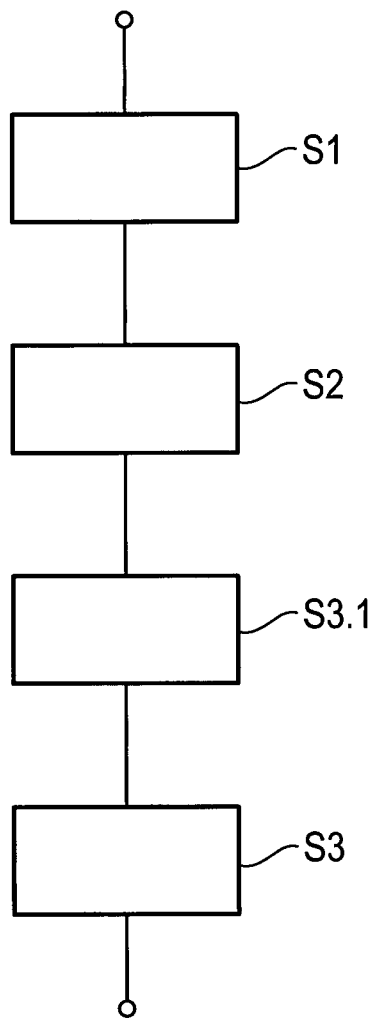
FIG. 11 shows a method sequence according to an embodiment for operating a compressed-air supply system.

FIG. 11 shows an illustrative method sequence, in which, in a first step S1, in a compressor startup mode preceding the charging mode, the changeover valve 40 is closed with respect to the vent line 70 by a rising flow pressure p of the compressed pressure air DL. In this case, the changeover valve 40 is closed with respect to the vent line 70 only with a speed such that a compressor 31 generating the flow pressure p of the compressed pressure air DL starts up substantially under no pressure.

In a second step S2, pressure air DL drawn in in a charging mode is compressed by a charging assembly 30 and fed via a changeover valve 40 to a pneumatic main line 60. In the charging mode, the changeover valve 40 is held closed with respect to the vent line 70 by a flow pressure of the compressed pressure air DL.

In a compressor stop mode preceding the venting mode and taking place in a preceding third step S3.1, pre-venting is carried out by means of a first part 60.1 of the pneumatic main line 60, said part be designed not to be leaktight in the static state, between the charging assembly 30 and a second part 60.2 of the pneumatic main line 60, and in this way the changeover valve 40 is opened to the vent line 70. In a third step S3, in a venting mode, pressure air DL is discharged from the pneumatic main line 60 via the changeover valve 40 into a vent line 70.

In all operating modes or steps S1, S2, S3.1, S3, a first part 60.1 of the pneumatic main line 60 between the charging assembly 30 and a second part 60.2 of the pneumatic main line 60 is held open independently of the pressure.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

0 intake connection
1 pressure-air feed
2 pressure-air connection
3 venting connection
0.31 filter
10 compressed-air supply system
20 intake line
30 charging assembly
31 compressor
32 feed line
40 changeover valve
40' pressure-air switch-through valve
41 pressure control connection
42 pass-through connection
43 outlet connection
47 valve spring
48 changeover valve body
48' valve seat of the changeover valve body
48" constriction
49 pressure-air distribution chamber
49' auxiliary pressure-air distribution chamber
60 main line
60.1, 60.2, 60.3 first, second, third part of the pneumatic main line
60.1-60.2 pneumatic path designed not to be leaktight in the static state
62 air dryer
62.1, 62.2 first, second connection of the air dryer
64 main restrictor
70 vent line
74 vent restrictor
74' spring support
90 pneumatic installation
92 accumulator
93 bellows valves
94 accumulator valve
95 gallery
100 pneumatic system
DL pressure air
p flow pressure
p_max maximum pressure
p_min minimum pressure
V_min minimum volume flow
E pressure-air venting direction
F spring force
G gas pressure force
S1 operating mode: compressor startup mode
S2 operating mode: charging mode
S3.1 operating mode: compressor stop mode
S3 operating mode: venting mode

The invention claimed is:

1. A compressed-air supply system for operating a pneumatic installation, the compressed-air supply system comprising:
    a pressure-air feed, to which a charging assembly having a compressor is connected on a pressure-medium feed side;
    a pressure-air connection to the pneumatic installation;
    a venting connection to the environment;
    a pneumatic main line between the pressure-air feed and the pressure-air connection;
    a vent line connected to the venting connection; and
    a changeover valve disposed between the pressure-air feed and the pressure-air connection in the pneumatic main line, the changeover valve including:
        a pressure control connection connected to a first part of the pneumatic main line, the first part of the pneumatic main line additionally being connected to the pressure-air feed,
        a pass through connection connected to a second part of the pneumatic main line, the second part of the pneumatic main line being connected to the pressure-air connection, and
        an outlet connection connected to the vent line connected to the venting connection,
    wherein, the charging assembly is configured to generate a flow pressure in the pneumatic main line at the pressure-control connection of the changeover valve, wherein, in an unpressurized state of the pressure-control connection, the changeover valve is in a first state configured to allow flow from the pressure-air connection to the vent line, wherein, in a pressurized state of the pressure-control connection, the changeover valve is in a second state configured to prevent flow from the pressure-air connection to the vent line, and wherein the changeover valve is configured to be controlled, by a volume flow of pressure air in the pneumatic main line at the pressure-control connection, so as to switch from the first state to the second state.

2. The compressed-air supply system as claimed in claim 1, wherein the pressure-air feed is configured to be opened, via the changeover valve, to the pressure-air connection in a manner dependent on the flow pressure in the pneumatic main line, wherein the changeover valve is configured to be controlled directly via operation of the compressor, and wherein a pressure-air switch-through valve is arranged downstream of the pressure control connection.

3. The compressed-air supply system as claimed in claim 1, wherein the changeover valve is configured to connect the pass-through connection to the outlet connection when a pressure applied to the pressure control connection exceeds a maximum pressure and/or when pressure air flowing through the pressure control connection falls below a minimum volume flow.

4. The compressed-air supply system as claimed in claim 1, wherein the changeover valve has a valve spring, the valve spring being operatively connected to a changeover valve body and having a valve spring force configured to overcome a gas pressure force, applied to the changeover valve body on a pressure-control connection side, in the event that the compressor is at rest.

5. The compressed-air supply system as claimed in claim 4, further comprising a vent restrictor configured to serve as a spring support for the valve spring, which is operatively connected to the changeover valve body, the vent restrictor being formed as a constriction by a valve seat, projecting partially into the vent line, of the changeover valve body.

6. The compressed-air supply system as claimed in claim 1, wherein the compressor and/or the outlet connection are not leak tight in a static state, such that the pneumatic installation can be automatically vented.

7. The compressed-air supply system as claimed in claim 6, wherein the changeover valve body is arranged so as to be movable coaxially with or transversely to the vent line.

8. A pneumatic system having a compressed-air supply system as claimed in claim 1 and having the pneumatic installation, which is connected to the pressure-air connection of the compressed-air supply system, the pneumatic installation having an accumulator or pressure-air reservoir and a plurality of bellows or pressure-air chambers.

9. A compressed-air supply system for operating a pneumatic installation, the compressed-air supply system comprising:

a pressure-air feed, to which a charging assembly having a compressor is connected on a pressure-medium feed side;

a pressure-air connection to the pneumatic installation;

a venting connection to the environment;

a pneumatic main line between the pressure-air feed and the pressure-air connection;

a vent line between the pressure-air feed and the venting connection; and a changeover valve associated with the pressure-air feed and configured to be controlled, by pressure air, to open the pressure-air feed to the main line, wherein, a flow pressure at the pressure-air feed can be generated by the charging assembly to the main line, wherein, in an unpressurized state of the pressure-air feed, the pressure-air connection is fluidly connected to the vent line, wherein, in a pressurized state of the pressure-air feed, the pressure-air connection is not fluidly connected to the vent line, wherein the changeover valve has a pressure-air distribution chamber, from which a pressure control connection connected to the charging assembly, a pass-through connection connected to the pneumatic main line, and an outlet connection connected to a start of the vent line, and wherein, when the pass-through connection to the main line is open, a changeover valve body, which can be moved against spring force, opens the outlet connection to the vent line in the unpressurized state of the pressure control connection and closes the outlet connection to the vent line in the pressurized state.

10. A compressed-air supply system for operating a pneumatic installation, the compressed-air supply system comprising:

a pressure-air feed, to which a charging assembly having a compressor is connected on a pressure-medium feed side;

a pressure-air connection to the pneumatic installation;

a venting connection to the environment;

a pneumatic main line between the pressure-air feed and the pressure-air connection;

a vent line between the pressure-air feed and the venting connection; and a changeover valve associated with the pressure-air feed and configured to be controlled, by pressure air, to open the pressure-air feed to the main line, wherein, a flow pressure at the pressure-air feed can be generated by the charging assembly to the main line, wherein, in an unpressurized state of the pressure-air feed, the pressure-air connection is fluidly connected to the vent line, wherein, in a pressurized state of the pressure-air feed, the pressure-air connection is not fluidly connected to the vent line, wherein the pressure-air feed is configured to be opened, via the changeover valve, to the main line independently of the pressure, and wherein the changeover valve is designed to be controlled by pressure air exclusively via a pressure control connection and/or directly via operation of the compressor.

11. A compressed-air supply system for operating a pneumatic installation, the compressed-air supply system comprising:

a pressure-air feed, to which a charging assembly having a compressor is connected on a pressure-medium feed side;

a pressure-air connection to the pneumatic installation;

a venting connection to the environment;

a pneumatic main line between the pressure-air feed and the pressure-air connection;

a vent line between the pressure-air feed and the venting connection; and a changeover valve associated with the pressure-air feed and configured to be controlled, by pressure air, to open the pressure-air feed to the main line, wherein, a flow pressure at the pressure-air feed can be generated by the charging assembly to the main line,
wherein, in an unpressurized state of the pressure-air feed, the pressure-air connection is fluidly connected to the vent line,
wherein, in a pressurized state of the pressure-air feed, the pressure-air connection is not fluidly connected to the vent line,
wherein a pressure-air switch-through valve is connected upstream and/or downstream of a pressure control connection, the pressure-air switch-through valve being configured to be switched through only when there is at least a minimum pressure applied to the pressure-air switch-through valve.

* * * * *